US012122560B2

(12) United States Patent
Todaka et al.

(10) Patent No.: US 12,122,560 B2
(45) Date of Patent: Oct. 22, 2024

(54) ZIPPER TAPE, BAG PROVIDED WITH ZIPPER TAPE, AND METHOD FOR MANUFACTURING BAG PROVIDED WITH ZIPPER TAPE

(71) Applicant: IDEMITSU UNITECH CO., LTD., Tokyo (JP)

(72) Inventors: Takumi Todaka, Tokyo (JP); Ryo Katada, Tokyo (JP)

(73) Assignee: IDEMITSU UNITECH CO., LTD., Tokyo (JP)

( * ) Notice: Subject to any disclaimer, the term of this patent is extended or adjusted under 35 U.S.C. 154(b) by 0 days.

(21) Appl. No.: 17/794,857

(22) PCT Filed: Jan. 22, 2021

(86) PCT No.: PCT/JP2021/002272
§ 371 (c)(1),
(2) Date: Jul. 22, 2022

(87) PCT Pub. No.: WO2021/149807
PCT Pub. Date: Jul. 29, 2021

(65) Prior Publication Data

US 2023/0065515 A1 Mar. 2, 2023

(30) Foreign Application Priority Data

Jan. 24, 2020 (JP) ................................ 2020-010324

(51) Int. Cl.
*B65D 33/25* (2006.01)
*A44B 19/16* (2006.01)
(Continued)

(52) U.S. Cl.
CPC .......... *B65D 33/2533* (2013.01); *A44B 19/16* (2013.01); *B31B 70/14* (2017.08);
(Continued)

(58) Field of Classification Search
CPC . B65D 33/2533; B65D 33/2583; B65D 75/66
(Continued)

(56) References Cited

U.S. PATENT DOCUMENTS 5,519,982 A 5/1996 Herber
5,525,363 A 6/1996 Herber
(Continued)

FOREIGN PATENT DOCUMENTS

EP 1 468 931 A1 10/2004
EP 3351128 A1 7/2018
(Continued)

OTHER PUBLICATIONS

International Search Report for PCT/JP2021/002272 dated Apr. 6, 2021.
(Continued)

*Primary Examiner* — Jes F Pascua
(74) *Attorney, Agent, or Firm* — MILLEN, WHITE, ZELANO & BRANIGAN, P.C.; Ryan R. Pool

(57) ABSTRACT

There is provided a zipper tape bonded to a bag body having a first surface and a second surface and including: a zipper tape body including a first base strip bonded to the first surface, a second base strip bonded to the first surface with a bonding portion, and engagement portions being mutually engageable and projecting from the first and second base strips, respectively; and a cutting strip provided in a region where the second base strip faces the first surface and does not face the first base strip. The zipper tape body is formed of a resin composition whose main component is a polyolefin resin. The cutting strip is formed of a resin composition whose main component is a polyolefin resin and includes a cutting strip body and a peelable layer layered on the cutting strip body and formed of a resin composition having peelability to a polyolefin resin.

30 Claims, 11 Drawing Sheets

(51) Int. Cl.

| | |
|---|---|
| ***B31B 70/14*** | (2017.01) |
| ***B31B 70/64*** | (2017.01) |
| ***B31B 70/81*** | (2017.01) |
| ***B65D 75/66*** | (2006.01) |

(52) U.S. Cl.
CPC .......... *B31B 70/64* (2017.08); *B31B 70/8131* (2017.08); *B65D 33/2583* (2013.01); *B65D 75/66* (2013.01)

(58) Field of Classification Search
USPC ............................................................ 383/63
See application file for complete search history.

(56) References Cited

U.S. PATENT DOCUMENTS

| | | | | |
|---|---|---|---|---|
| 7,476,030 | B1 * | 1/2009 | Kuge | B65D 33/2533 383/203 |
| 7,597,480 | B2 * | 10/2009 | Kuge | B65D 75/66 383/66 |
| 9,227,774 | B2 * | 1/2016 | Nanba | B65D 75/66 |
| 11,649,090 | B2 | 5/2023 | Todaka et al. | |
| 2003/0215163 | A1 | 11/2003 | Schneider | |
| 2009/0022435 | A1 * | 1/2009 | Tanaka | B29C 65/5021 24/585.12 |
| 2009/0050254 | A1 | 2/2009 | Goto et al. | |
| 2009/0238500 | A1 | 9/2009 | Nanba et al. | |
| 2015/0375902 | A1 | 12/2015 | Nanba et al. | |
| 2017/0073118 | A1 | 3/2017 | Nanba et al. | |
| 2018/0251268 | A1 * | 9/2018 | Todaka | B31B 70/8133 |
| 2020/0231339 | A1 | 7/2020 | Katada | |
| 2020/0407122 | A1 | 12/2020 | Namba | |
| 2021/0023828 | A1 | 1/2021 | Yamada et al. | |
| 2021/0188486 | A1 | 6/2021 | Nanba et al. | |
| 2024/0059458 | A1 | 2/2024 | Namba | |

FOREIGN PATENT DOCUMENTS

| | | | | | |
|---|---|---|---|---|---|
| JP | H09207948 | A | | 8/1997 | |
| JP | 2007331805 | A | | 12/2007 | |
| JP | 2011246193 | A | | 12/2011 | |
| JP | 4908228 | B2 | | 4/2012 | |
| JP | 2014114035 | A | * | 6/2014 | |
| JP | 201820843 | A | | 2/2018 | |
| JP | 2019 51963 | A | | 4/2019 | |
| JP | 2019189333 | A | | 10/2019 | |
| TW | 243431 | B | | 3/1995 | |
| TW | 201843088 | A | | 12/2018 | |
| WO | 2006062136 | A1 | | 6/2006 | |
| WO | 2006112448 | A1 | | 10/2006 | |
| WO | WO-2016114303 | A1 | * | 7/2016 | A44B 19/16 |
| WO | 2018207631 | A1 | | 11/2018 | |

OTHER PUBLICATIONS

English Abstract for WO2018207631, Publication Date: Nov. 15, 2018.
English Abstract for JP2018020843, Publication Date: Feb. 8, 2018.
English Abstract of JP2019189333, Publication Date: Oct. 31, 2019.
English Abstract of WO2006062136, Publication Date: Jun. 15, 2006.
English Abstract of JP2007331805, Publication Date: Dec. 27, 2007.
English Abstract of WO2006112448, Publication Date: Oct. 26, 2006.
English Abstract of JPH09207948, Publication Date: Aug. 12, 1997.
English Abstract of JP2011246193, Publication Date: Dec. 8, 2011.
Search report in corresponding EP 21744351.4 dated Feb. 13, 2024 (pp. 1-10).
Office Action issued in corresponding Taiwanese patent application No. 110102554 on Aug. 15, 2024.

* cited by examiner

ZIPPER TAPE, BAG PROVIDED WITH ZIPPER TAPE, AND METHOD FOR MANUFACTURING BAG PROVIDED WITH ZIPPER TAPE

TECHNICAL FIELD

The present invention relates to a zipper tape, a zipper-tape-attached bag, and a manufacturing method of a zipper-tape-attached bag.

BACKGROUND ART

There has been known a technique for a zipper-tape-attached bag, in which a cutting tape is used for making an opening in a bag body. The cutting tape attached to the bag body enables the bag to be linearly opened.

For instance, Patent Literature 1 discloses a technique in which a cutting tape is formed using a material (e.g., polypropylene) having peelability with respect to a material (e.g., polyethylene) of forming a zipper tape, leading to interfacial peeling between the cutting tape and the zipper tape, reducing resistance on opening the bag.

CITATION LIST

Patent Literature(s)

Patent Literature 1 JP patent No. 4908228

SUMMARY OF THE INVENTION

Problems to be Solved by the Invention

It should be noted that "mono-material production," in which all or at least not less than a predetermined ratio of the material of plastic products is provided by a single compound, has recently been popular in order to enhance recyclability of plastic products. In a case of the above-described zipper tape attached with the cutting tape, consideration is given to mono-material production by forming a zipper tape with, for instance, a resin composition containing polyethylene as a main component, thereby further increasing a content of a single resin as a whole.

However, when the cutting tape and the zipper tape are formed with a resin composition whose main component is the same resin, on opening a bag using the cutting tape, it is sometimes difficult for the cutting tape to peel off from the zipper tape to hamper opening the bag.

An object of the invention is to provide a zipper tape provided with a cutting tape, in which a content ratio of a single resin is increasable without compromising resistance on opening a bag, a bag attached with the zipper tape, and a manufacturing method of the bag attached with the zipper tape.

Means for Solving the Problem(s)

According to an aspect of the invention, there is provided a zipper tape bonded to a bag body having a first surface and a second surface opposite from each other, the zipper tape including: a zipper tape body including: a first base strip bonded to the first surface; a second base strip partially facing the first base strip and having a region not facing the first base strip, the region including a bonding portion bonded to the first surface; and a first engagement portion and a second engagement portion being mutually engageable and projecting from the first base strip and the second base strip, respectively; and a cutting strip provided in a region where the second base strip faces the first surface and does not face the first base strip, in which the zipper tape body is formed of a resin composition whose main component is a polyolefin resin, and the cutting strip includes: a cutting strip body formed of the resin composition whose main component is the polyolefin resin, and bonded to the first surface; and a peelable layer layered on at least a part of at least an opposite surface of the cutting strip body from a surface of the cutting strip body bonded to the first surface, the peelable layer being formed of a resin composition having peelability with respect to the polyolefin resin.

In the zipper tape according to [1], the polyolefin resin is polyethylene.

In the zipper tape according to [2], the peelable layer is formed of a resin composition whose main component is polypropylene.

In the zipper tape according to [1], the polyolefin resin is polypropylene.

In the zipper tape according to [4], the peelable layer is formed of a resin composition whose main component is polyethylene.

In the zipper tape according to any one of [1] to [5], the second base strip is formed wider than the first base strip.

In the zipper tape according to any one of [1] to [6], the cutting strip is connected to an end of the first base strip close to the bonding portion, the cutting strip being integrated with the first base strip.

In the zipper tape according to any one of [1] to [6], the cutting strip is layered on the second base strip.

In the zipper tape according to any one of [1] to [8], the peelable layer is layered on at least a part of the cutting strip in a width direction.

In the zipper tape according to any one of [1] to [9], the peelable layer is layered on all surfaces of the cutting strip body except for a surface thereof bonded to the first surface.

In the zipper tape according to any one of [1] to [10], the cutting strip further includes an additional layer that is layered on the peelable layer on the opposite surface of the cutting strip from the surface thereof bonded to the first surface and is formed of the resin composition whose main component is the polyolefin resin.

In the zipper tape according to any one of [1] to [11], the polyolefin resin in the resin composition forming the zipper tape has a content of 70 mass % or more.

In the zipper tape according to any one of [1] to [12], the polyolefin resin includes a polyolefin resin derived from biomass.

The zipper tape according to any one of [1] to further includes: a first seal layer formed on a surface of the first base strip bonded to the first surface; a second seal layer formed on a surface of the bonding portion bonded to the first surface; and a third seal layer formed on the surface of the cutting strip body bonded to the first surface.

In the zipper tape according to [1], the cutting strip is connected to an end of the first base strip close to the bonding portion through a connection surface so as to be integrated with the first base strip, and the peelable layer is layered on at least the opposite surface of the cutting strip body from the surface bonded to the first surface.

In the zipper tape according to [15], the peelable layer is further layered on at least one surface of: at least the opposite surface of the cutting strip body from the first base strip; a surface of the cutting strip body close to the first base strip and closer to the second surface than the connection surface; or a surface of the cutting strip body close to the first base strip and closer to the first surface than the connection surface.

In the zipper tape according to or [16], the polyolefin resin is polyethylene, and the peelable layer is formed of a resin composition containing polypropylene as a main component, and polyethylene.

In the zipper tape according to [17], the polyethylene is linear low density polyethylene.

In the zipper tape according to or [16], the polyolefin resin is polypropylene, and the peelable layer is formed of a resin composition containing polyethylene as a main component, and polypropylene.

According to another aspect of the invention, there is provided a zipper-tape-attached bag including: a bag body having a first surface and a second surface opposite from each other; and the zipper tape according to [1] to in which the first base strip, the cutting strip, and the bonding portion are bonded to the first surface, in which a first notch formed in at least the first surface and the cutting strip defines a tab.

In the zipper-tape-attached bag according to [20], the tab is formed in a seal portion provided by sealing the first surface and the second surface, the first notch penetrates the first surface and the second surface, and the seal portion further includes a second notch starting from the second surface and not penetrating the cutting strip.

The zipper-tape-attached bag according to further includes: an enclosing seal portion provided by sealing the first surface and the second surface in a region enclosing the tab.

According to still another aspect of the invention, there is provided a manufacturing method of the zipper-tape-attached bag according to [21], including: forming the seal portion in the bag body using a sealer; and forming a second notch in the seal portion using a cutting blade and a receiver base facing each other across the bag body.

The manufacturing method of the zipper-tape-attached bag according to further includes: forming the enclosing seal portion in the bag body using a sealer; and forming a first notch in a region enclosed by the enclosing seal portion using a cutting blade and a receiver base facing each other across the bag body.

According to a further aspect of the invention, there is provided a zipper-tape-attached bag including: a bag body having a first surface and a second surface opposite from each other; a zipper tape body including: a first base strip bonded to the first surface; a second base strip partially facing the first base strip and having a region not facing the first base strip, the region including a bonding portion bonded to the first surface; and a first engagement portion and a second engagement portion being mutually engageable and projecting from the first base strip and the second base strip, respectively; and a cutting strip provided in a region where the second base strip faces the first surface and does not face the first base strip, in which the zipper tape body is formed of a resin composition whose main component is a polyolefin resin, and the cutting strip includes: a cutting strip body formed of the resin composition whose main component is the polyolefin resin, and bonded to the first surface; and a peelable layer layered on at least one part of at least an opposite surface of the cutting strip body from a surface of the cutting strip body bonded to the first surface, the peelable layer being formed of a resin composition having peelability with respect to the polyolefin resin.

In the zipper-tape-attached bag according to [25], at least one pair of the first base strip and the first surface, the bonding portion and the first surface, or the cutting strip body and the first surface are bonded to each other through a seal layer.

According to the above aspects of the invention, since the zipper tape body and the cutting strip are formed of a resin composition whose main component is a single polyolefin resin, a content ratio of the single polyolefin resin in the entire zipper tape can be increased as compared with when the zipper tape body and the cutting strip are formed of different polyolefin resins.

BRIEF DESCRIPTION OF DRAWING(S)

DESCRIPTION OF EMBODIMENT(S)

Figure 1:
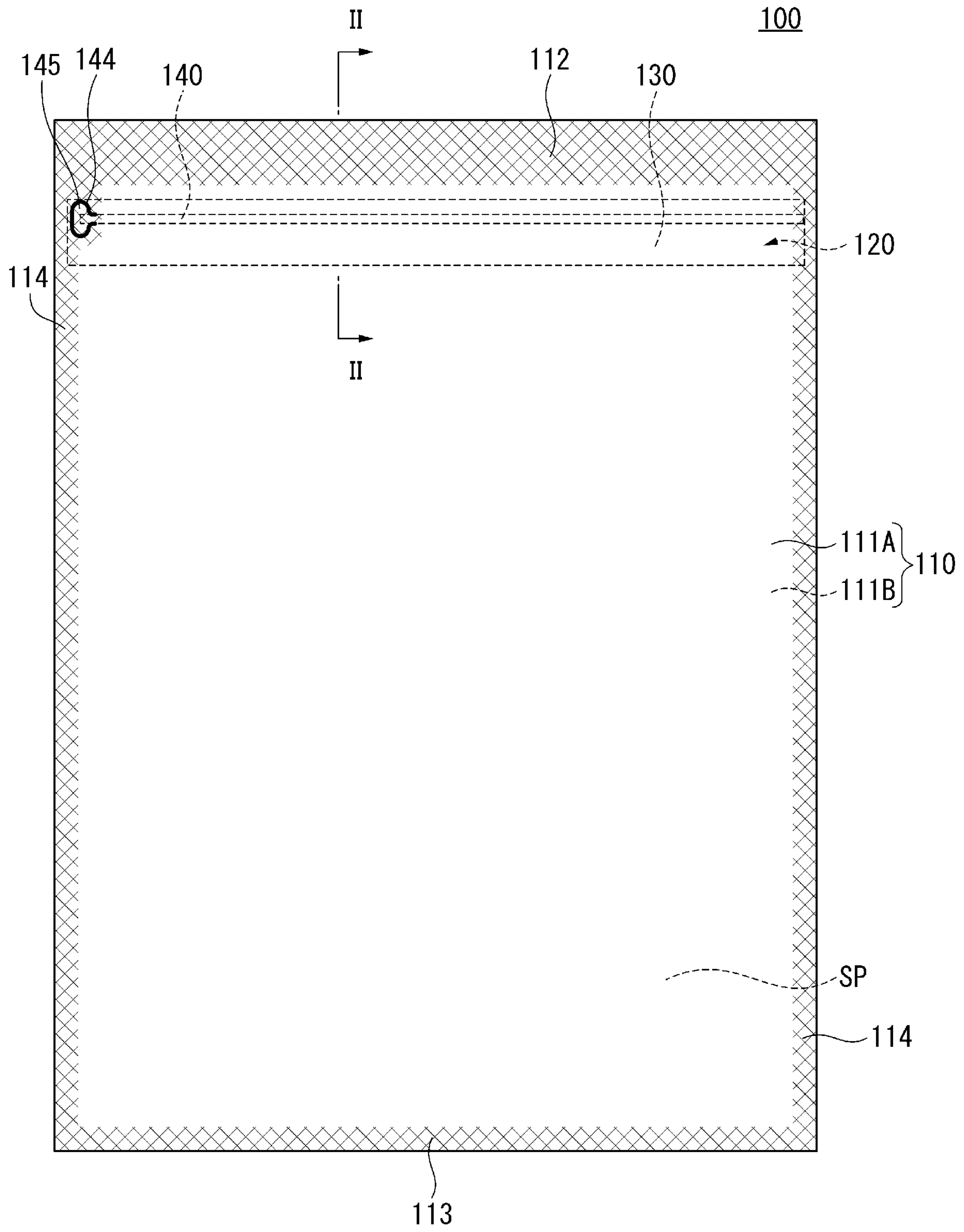
FIG. 1 is a plan view showing a zipper-tape-attached bag according to a first exemplary embodiment of the invention.

Suitable exemplary embodiments of the invention will be described in detail below with reference to the attached drawings. It should be noted that components of the same or substantially the same function(s) and structure(s) will be denoted by the same reference numerals herein and in the drawings, omitting repetition of description thereof.

First Exemplary Embodiment

Figure 2:
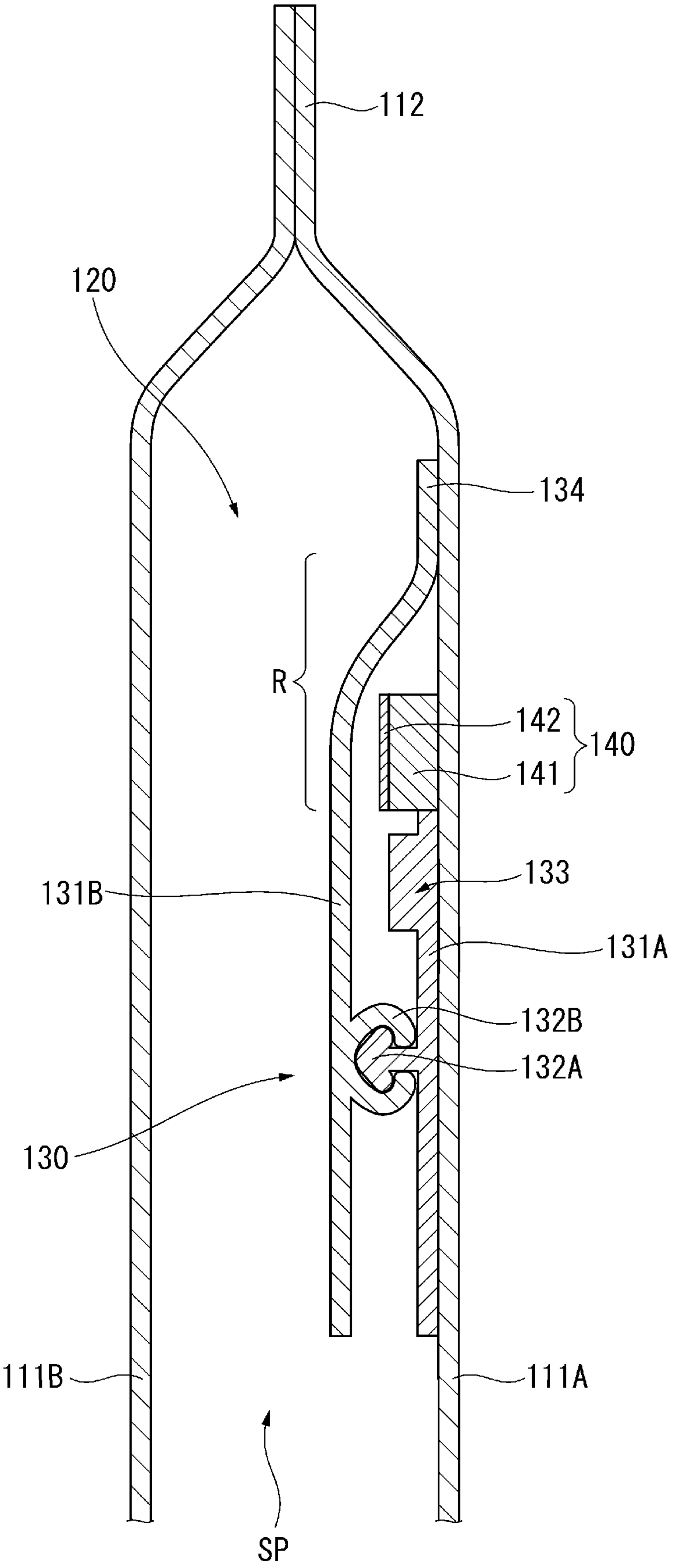
FIG. 2 is a cross sectional view taken along a II-II line of the zipper-tape-attached bag shown in FIG. 1.

FIG. 1 is a plan view showing a zipper-tape-attached bag in a first exemplary embodiment of the invention. FIG. 2 is a cross sectional view taken along a II-II line of the zipper-tape-attached bag shown in FIG. 1. As shown in the drawings, a zipper-tape-attached bag 100 includes: a bag body formed by a film 110 having a first surface 111A facing a containing space SP; and a zipper tape 120 bonded to the first surface 111A of the film 110.

In the exemplary embodiment, the film 110 has, in addition to the first surface 111A, a second surface 111B facing the first surface 111A. The first surface 111A and the second surface 111B each face the containing space SP. In other words, the bag body formed by film 110 has the first surface 111A and the second surface 111B facing each other.

The film 110 is made of, for instance, a single- or multi-layered thermoplastic resin. More specifically, the film 110 may be made of low-density polyethylene (LDPE), linear low density polyethylene (LLDPE), or polypropylene (PP). PP may be Polypropylene Homopolymer (HPP), Polypropylene Random Copolymer (RPP), or Polypropylene Block Copolymer (BPP). When the film 110 is a multi-layered film, a top base material of the multi-layered film may be OPP (biaxially Oriented PolyPropylene), OPET (biaxially Oriented PolyEthylene Terephthalate), or ONy (biaxially Oriented Nylon). These resins are not necessarily derived from fossil fuel. For instance, these resins may be eco-friendly bioplastic or a mixture of a fossil-fuel-derived resin and bioplastic. Moreover, the film 110 optionally includes a layer of an inorganic material formed by vapor-depositing aluminum or layering an aluminum foil.

In the exemplary embodiment, two films 110 are bonded to each other at a top seal portion 112, a bottom seal portion 113, and side seal portions 114 to form a bag body. However, in another exemplary embodiment, a single film 110 may be folded at a portion corresponding to a side seal portion 114. Moreover, the film 110 may be folded inward at a portion corresponding to the bottom seal portion 113 or portions corresponding to the side seal portions 114 to form a so-called gusset. In this case, the gusset may be formed by the film 110 or by another film bonded to the film 110. Further, the zipper-tape-attached bag 100 may be a stand up pouch capable of standing upright on the gusset formed at a bottom thereof.

The zipper tape 120 is an elongated component having a zipper tape body 130 and a cutting strip 140 in a cross sectional profile thereof. The zipper tape 120 is attached to the film 110 by being bonded thereto by heat sealing, ultrasonic sealing or the like.

The zipper tape body 130 includes: a first base strip 131A; a second base strip 131B facing the first base strip 131A; and a first engagement portion 132A and a second engagement portion 132B respectively projecting from the first base strip 131A and the second base strip 131B, the first engagement portion 132A and the second engagement portion 132B being mutually engageable. The second base strip 131B is wider than the first base strip 131A and partially faces the first base strip 131A. The second base strip 131B has a region not facing the first base strip 131A (i.e., extension).

It should be noted that the second base strip 131B is not necessarily wider than the first base strip 131A.

The first base strip 131A is bonded to the first surface 111A of the film 110. With an opposite surface of the first base strip 131A from a surface thereof on which the first engagement portion 132A is formed, the first base strip 131A is bonded to the first surface 111A.

The second base strip 131B is bonded to the first surface 111A at a bonding portion 134 in the region not facing the first base strip 131A.

In other words, in the zipper-tape-attached bag 100 of the exemplary embodiment, the first base strip 131A is bonded to the first surface 111A of the film 110 while the bonding portion 134 of the second base strip 131B is bonded to the first surface 111A closer to the top seal portion 112 than the first base strip 131A.

The zipper-tape-attached bag 100 can be sealed and re-sealed since the first engagement portion 132A and the second engagement portion 132B of the zipper tape body 130 are shaped to be mutually engageable and disengageable. It should be noted that the first engagement portion 132A and the second engagement portion 132B are not necessarily shaped as illustrated but may be shaped as in engagement portions of known various zippers (e.g. a combination of claw-shape, hook-shape, and knob-shape). In the illustrated example, the first engagement portion 132A is in a male shape and the second engagement portion 132B is in a female shape, and optionally vice versa. Further, although a pair of engagement portions is provided in the illustrated example, a plurality of pairs of engagement portions may be provided.

A first convex portion 133 thicker than the first base strip 131A is formed at an end of the first base strip 131A closer to the cutting strip 140 in a width direction of the zipper tape body 130.

The zipper tape body 130 as described above is formed of a resin composition whose main component is polyethylene that is a polyolefin resin. More specifically, the zipper tape body 130 can be formed of low-density polyethylene (LDPE) or linear low density polyethylene (LLDPE). The polyethylene is not necessarily a resin derived from fossil fuel, and may be eco-friendly bioplastic (e.g., polyolefin resin derived from biomass) or a mixture of a fossil-fuel-derived resin and bioplastic. Bioplastic is preferably biopolyethylene. Known additives such as a stabilizer, antioxidant, lubricant, antistatic agent, or coloring agent may be added to the resin composition as necessary.

The cutting strip 140 is disposed in a region R where the second base strip 131B faces the first surface 111A but does not face the first base strip 131A. Specifically, the cutting strip 140 is disposed between the bonding portion 134 and the end of the first base strip 131A (the end thereof closer to the top seal portion 112) in the width direction of the zipper tape body 130.

In the illustrated example, the cutting strip 140 is connected to the first base strip 131A so as to be integrated with the first base strip 131A. The cutting strip 140 includes: a cutting strip body 141 bonded to the first surface 111A; and a peelable layer 142 layered on an opposite surface of the cutting strip body 141 from the surface thereof bonded to the first surface 111A.

Similar to the zipper tape body 130, the cutting strip body 141 is formed of a resin composition whose main component is polyethylene. In the illustrated example, a thickness of the cutting strip body 141 is comparable to that of the first convex portion 133.

The peelable layer 142 in the exemplary embodiment is formed on the surface of the cutting strip body 141 facing the second base strip 131B. The peelable layer 142 is formed of a resin composition having peelability with respect to polyethylene. Here, "having peelability" means that a peel strength to a target object is 20 N/15 mm or less, preferably 16 N/15 mm or less, further preferably 10 N/15 mm or less.

Specifically, the peelable layer 142 is formed of, for instance, a resin composition whose main component is polypropylene (PP). PP may be Polypropylene Homopolymer (HPP), Polypropylene Random Copolymer (RPP), Polypropylene Block Copolymer (BPP), or a mixture thereof. Since the peelable layer 142 layered on the surface of the cutting strip body 141 facing the second base strip 131B is formed of the resin composition having peelability with respect to polyethylene, the cutting strip 140 can be easily peeled from the second base strip 131B for opening a bag.

In the invention, combinations of resin compositions having peelability as described above are a combination of a resin composition whose main component is polyethylene and a resin composition whose main component is polypropylene or polystyrene, a combination of a resin composition whose main component is polyethylene and a resin composition whose main component is a mixture of polypropylene and polystyrene, a combination of a resin composition whose main component is polyethylene and a resin composition whose main component is a mixture of polypropylene and polyethylene, a combination of a resin composition whose main component is polyethylene and a resin composition whose main component is a mixture of polystyrene and polyethylene, and a combination of a resin composition whose main component is polyethylene and a resin composition whose main component is a mixture of polypropylene, polyester, and polyethylene. Peelability of a combination of other resin compositions can be checked according to a thermal gradient test.

In the thermal gradient test, it is confirmed using a thermal gradient tester that a peel strength to a target object sealed at 0.2 MPa at 230 degrees C. for one second is 20 N/15 mm or less, preferably 16 N/15 mm or less, further preferably 10 N/15 mm or less.

Figure 3:
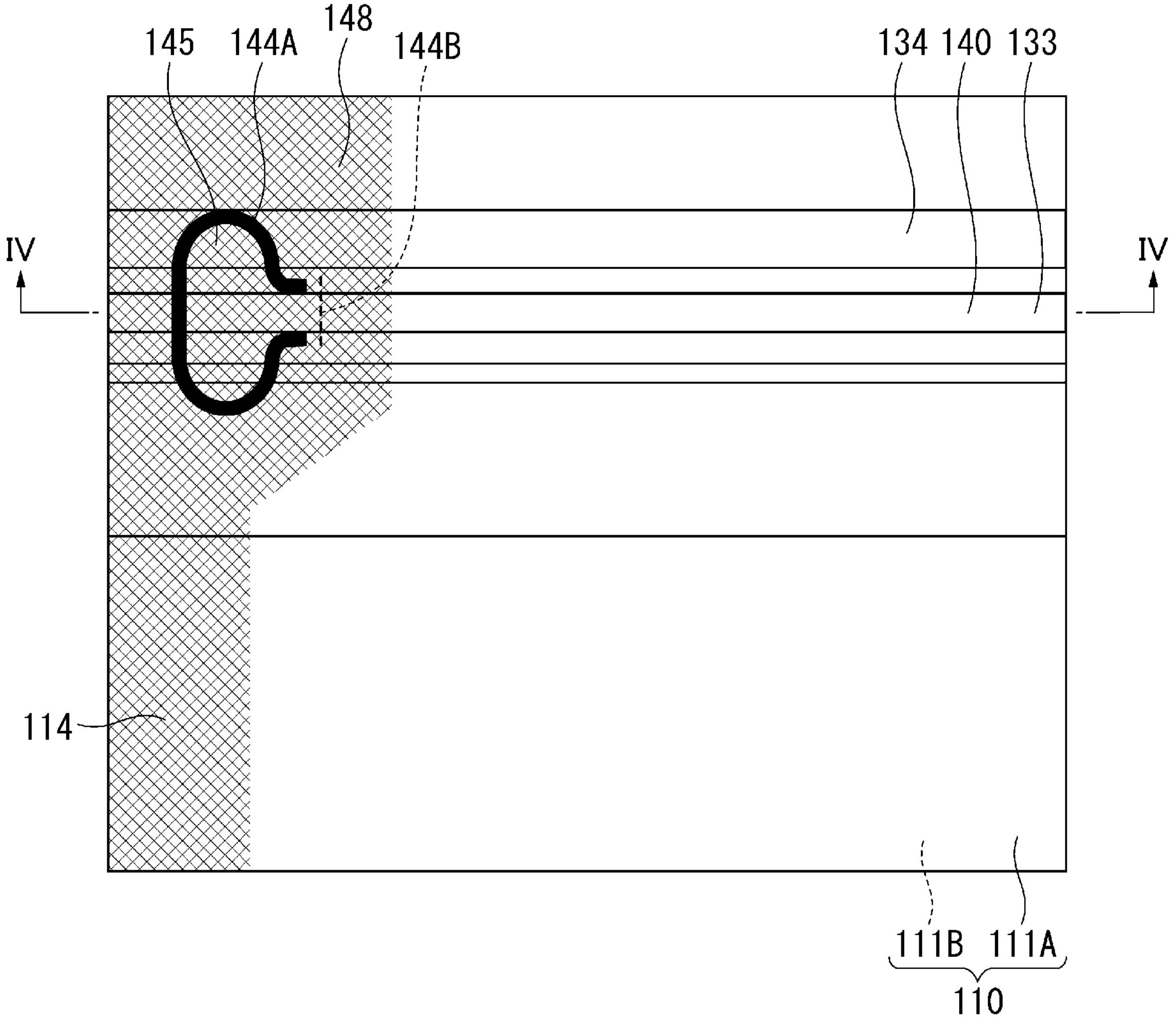
FIG. 3 is a partial plan view showing the zipper-tape-attached bag according to the first exemplary embodiment of the invention.
Figure 4:
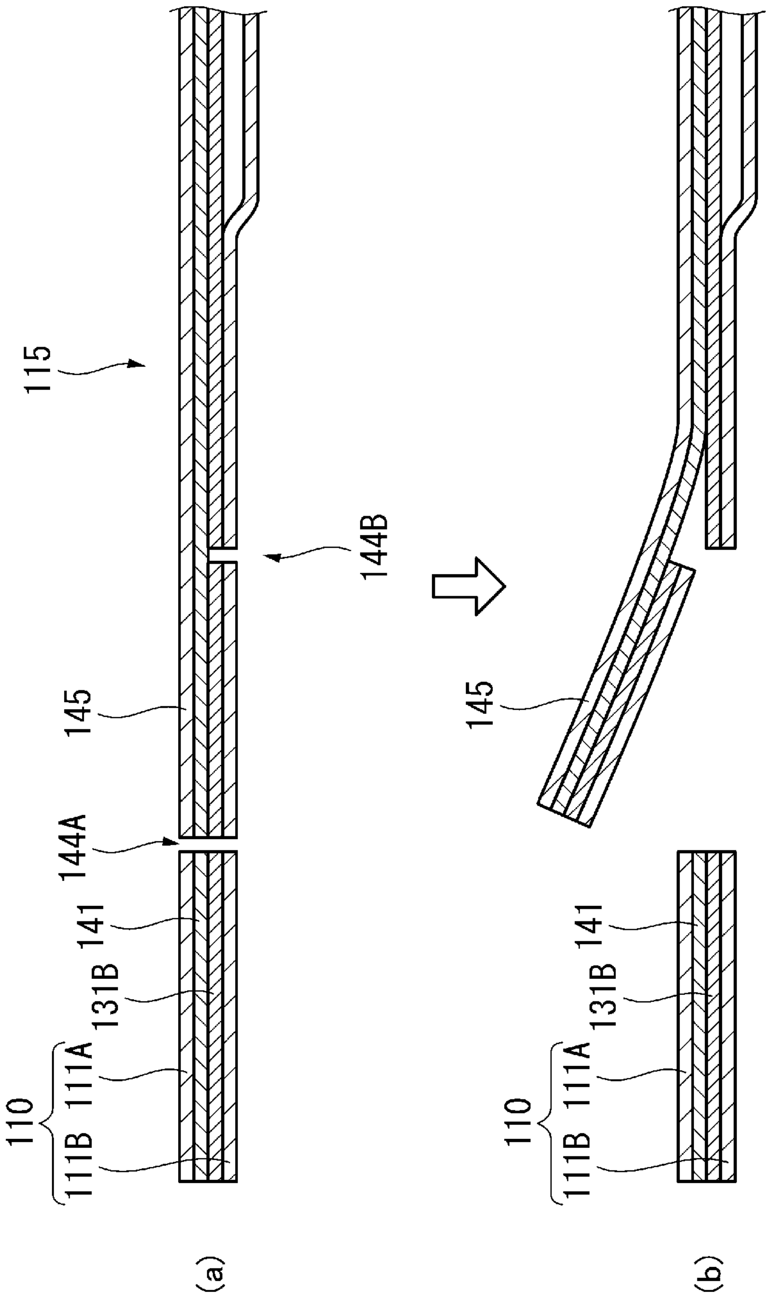
FIG. 4 is a cross sectional view taken along a IV-IV line in FIG. 3.

FIG. 3 is a plan view showing a part of the zipper-tape-attached bag 100 in the first exemplary embodiment of the invention. FIG. 4 is a cross sectional view taken along a IV-IV line in FIG. 3.

In the exemplary embodiment, a seal portion 148 is formed by extending the side seal portion 114 close to an end of the zipper tape 120 toward the center in the width direction of the bag body. A first notch 144A is formed in the seal portion 148, defining a tab 145 for opening a bag. As shown in FIG. 4(*a*), the first notch 144A is formed penetrating the first surface 111A, the cutting strip 140, the second base strip 131B, and the second surface 111B.

Further, the seal portion 148 has a second notch 144B starting from the second surface 111B and formed adjacent to the tab 145. The second notch 144B is formed starting from the second surface 111B to penetrate the second base strip 131B. The second notch 144B does not penetrate the first surface 111A and the cutting strip 140. It is not necessary that the second notch completely penetrates the second base strip 131B.

A user can pull up four layers from the first surface 111A to the second surface 111B with the tab 145 as a starting point as shown in FIG. 4(*b*). When the user pinches and pulls the tab 145, the cutting strip body 141 is separated from the second base strip 131B due to the second notch 144B, and only the first surface 111A is cut along the cutting strip body 141, thereby opening the bag 100.

At this time, interfacial peeling occurs between the second base strip 131B and the peelable layer 142. However, in some cases, interfacial peeling occurs between the cutting strip body 141 and the peelable layer 142.

Next, a manufacturing method of a zipper-tape-attached bag having the first notch 144A (tab 145) and the second notch 144B will be described.

The manufacturing method of the zipper-tape-attached bag includes: forming the seal portion 148 in the bag body using a sealer; and forming the first notch 144A and the second notch 144B in the seal portion 148 using a cutting blade and a receiver base facing each other across the bag body.

According to the first exemplary embodiment of the invention described above, since the zipper tape body 130 and the cutting strip body 141 are formed of a resin composition whose main component is polyethylene, a content ratio of polyethylene in the entire zipper tape 120 can be increased to improve recycling suitability, as compared with, for instance, when the cutting strip body 141 is formed of polypropylene.

In the invention, the main component means that a content thereof in a resin composition is 50 mass % or more, preferably 70 mass % or more, more preferably 85 mass % or more, further preferably 90 mass % or more, particularly preferably 95 mass % or more. An upper limit of the content of the main component in the resin composition is 100%. Even in this case, inclusion of impurities within the range that does not affect the performance is allowable. Examples of impurities include general additives, fatty acid amides, inorganic substances such as silica, and pigments such as titanium oxide.

A resin that is a main component in a resin composition can be confirmed by, for instance, IR method. Examples of the resin composition other than polyethylene include polypropylene, polystyrene, elastomers (modifiers such as ethylene elastomers, propylene elastomers, and styrene elastomers), and COC.

In the meantime, in the exemplary embodiment, since the peelable layer 142 is formed on the opposite surface of cutting strip 140 from the surface thereof bonded to the first surface 111A, even when the cutting strip body 141 is formed of a resin composition whose main component is polyethylene in the same manner as the zipper tape body 130, resistance on opening is reducible, so that opening of the zipper-tape-attached bag 100 can be made easy.

Moreover, since the first convex portion 133 is formed at an end of the first base strip 131A, when the cutting strip body 141 is pulled, a cutting of the first surface 111A is guided so as to proceed linearly along the first convex portion 133. This can stabilize a shape of an opening to be formed in the first surface 111A.

In the exemplary embodiment, polyethylene is employed as a polyolefin resin forming the zipper tape body 130 and the cutting strip body 141, however, the polyolefin resin is not limited to polyethylene. For instance, polypropylene may be employed as the polyolefin resin forming the zipper tape body 130 and the cutting strip body 141, while the peelable layer 142 may be formed of polyethylene that is a resin composition having peelability with respect to polypropylene.

Moreover, the film 110 forming the bag 100 is preferably formed of the same polyolefin resin as the polyolefin resin forming the zipper tape body 130 and the cutting strip body 141. In other words, the main component of the film 110 in the exemplary embodiment is preferably polyethylene. In this case, contents of resin compositions other than polyethylene in the entire zipper-tape-attached bag 100 are preferably 5 mass % or less. Likewise, when the polyolefin resin forming the zipper tape body and the cutting strip body is polypropylene, the main component of the film is preferably polypropylene and contents of resin compositions other than polypropylene in the entire zipper-tape-attached bag are preferably 5 mass % or less, more preferably 4 mass % or less, further preferably 3 mass % or less.

In the exemplary embodiment, the peelable layer 142 is formed on the entire opposite surface of the cutting strip body 141 from the surface bonded to the first surface 111A, however, the arrangement of the peelable layer 142 is not limited thereto. For instance, it is sufficient that the peelable layer 142 is layered on at least a part of the cutting strip 140 in the width direction (in a top-bottom direction in FIG. 2).

Figure 5:
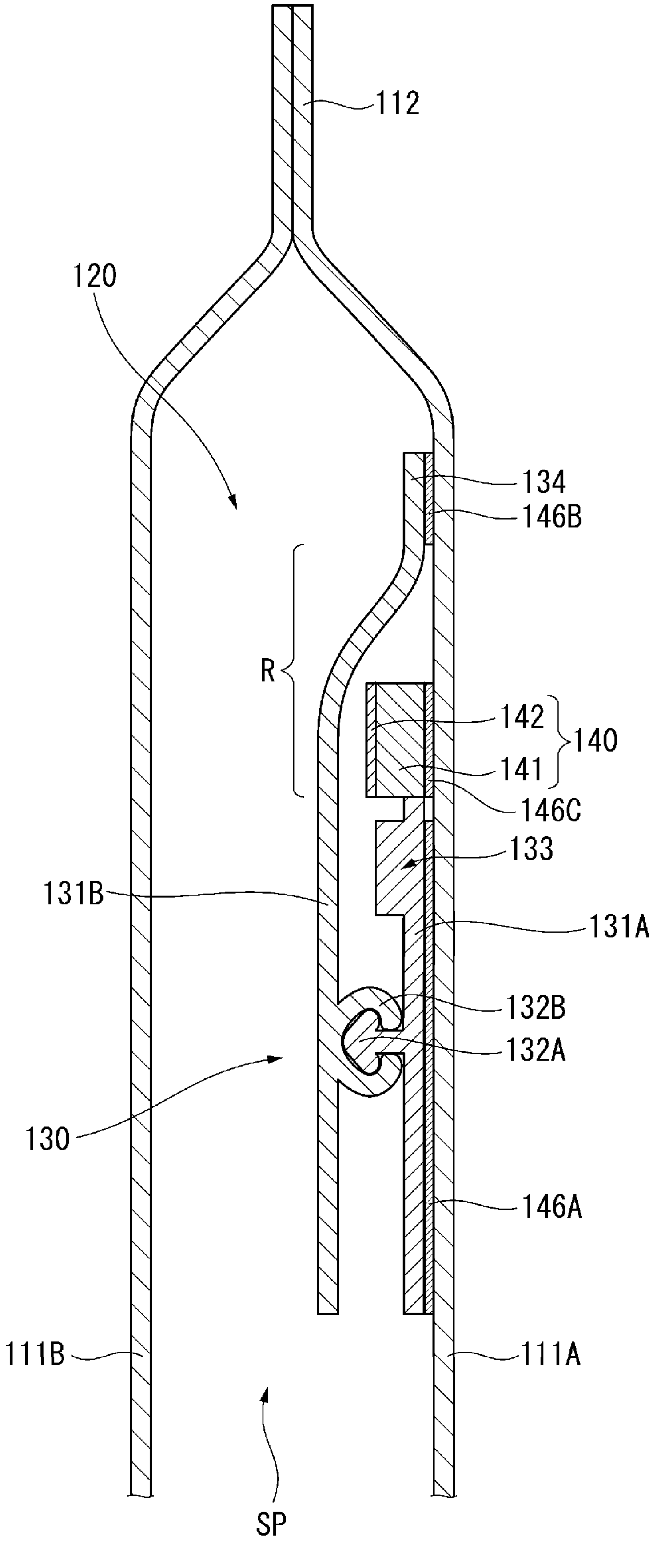
FIG. 5 is a cross sectional view showing a zipper-tape-attached bag according to a modification of the first exemplary embodiment of the invention.

Moreover, as shown in a modification of FIG. 5, a seal layer may be formed on a surface of each of the first base strip 131A, the bonding portion 134, and the cutting strip body 141 that are bonded to the first surface 111A. In the illustrated example, a first seal layer 146A is formed on the surface of the first base strip 131A that is bonded to the first surface 111A. The surface of the first base strip 131A opposite from the surface thereof on which the first engagement portion 132A is formed is bonded to the first surface 111A through the first seal layer 146A. Likewise, in the illustrated example, a second seal layer 146B is formed on the surface of the bonding portion 134 to be bonded to the first surface 111A, and a third seal layer 146C is formed on the surface of the cutting strip body 141 to be bonded to the first surface 111A.

Moreover, a seal layer may be formed on a surface facing the first surface 111A of a connection portion between the cutting strip 140 and the first base strip 131A.

When polyethylene is employed as the polyolefin resin forming the zipper tape body 130 and the cutting strip body 141, for instance, a resin forming the seal layer is preferably polyethylene having a melting point of 110 degrees C. or less, more preferably metallocene linear low density polyethylene having a melting point of 105 degrees C. or less. When polypropylene is employed as the polyolefin resin forming the zipper tape body 130 and the cutting strip body 141, the resin forming the seal layer is preferably polypropylene having a melting point of 150 degrees C. or less.

Second Exemplary Embodiment

Figure 6:
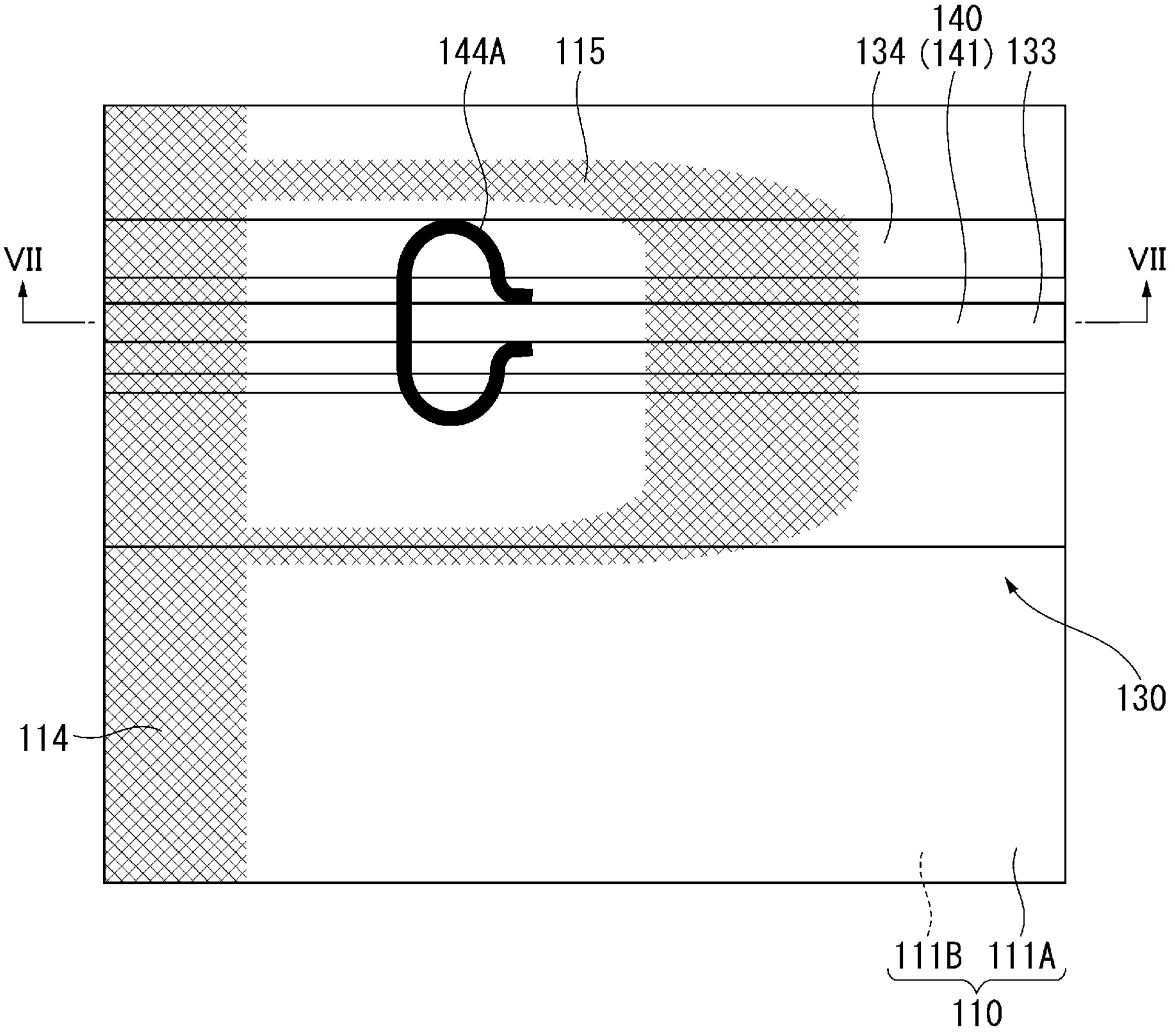
FIG. 6 is a partial plan view showing a zipper-tape-attached bag according to a second exemplary embodiment of the invention.
Figure 7:
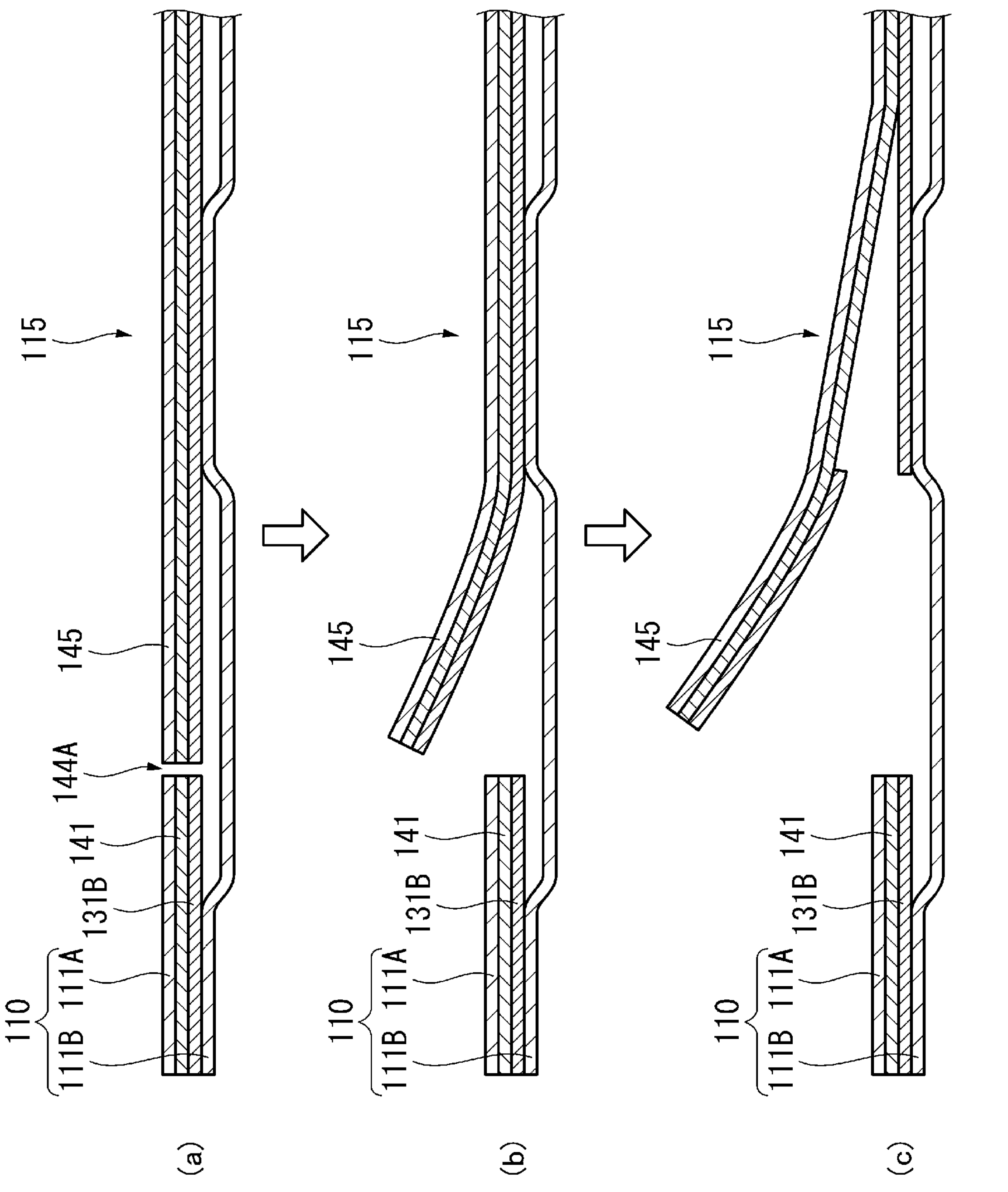
FIG. 7 is a cross sectional view taken along a VII-VII line in FIG. 6.

FIG. 6 is a plan view showing a part of a zipper-tape-attached bag in a second exemplary embodiment of the invention. FIG. 7 is a cross sectional view taken along a VII-VII line in FIG. 6. It should be noted that since components in the second exemplary embodiment except for an enclosing seal portion and a tab described below are the same as those in the first exemplary embodiment, a duplicate detailed description will be omitted.

As shown in FIG. 6, the zipper-tape-attached bag in the second exemplary embodiment includes an enclosing seal portion 115 in addition to the side seal portion 114. A part of the side seal portion 114 and the enclosing seal portion 115 define a seal portion having an enclosing shape.

The first notch 144A (tab 145) in the exemplary embodiment is formed in a region enclosed by the side seal portion 114 and the enclosing seal portion 115. Moreover, the second notch 114B is not formed in the zipper-tape-attached bag 100 of the exemplary embodiment.

The zipper tape body 130 and the cutting strip body 141 in the second exemplary embodiment are formed of a resin composition whose main component is polyethylene that is a polyolefin resin in the same manner as in the zipper tape 120 of the first exemplary embodiment. The polyolefin resin forming the zipper tape body 130 and the cutting strip body 141 is not limited to polyethylene but may be polypropylene, while the peelable layer may be formed of polyethylene that is a resin composition having peelability with respect to polypropylene.

Since the first notch 144A is formed penetrating the first surface 111A, the cutting strip body 141, and the second base strip 131B as shown in FIG. 7(*a*), a user can pull up the aforementioned three layers from the first surface 111A starting from the tab 145 defined by the notch 144A as shown in FIG. 7(*b*). When the user pinches and pulls the tab 145, the second base strip 131B is broken in the enclosing seal portion 115 as shown in FIG. 7(*c*), and only the first surface 111A is cut along the cutting strip body 141, thereby opening the bag.

Next, a manufacturing method of the zipper-tape-attached bag having the enclosing seal portion 115 will be described.

The manufacturing method of the zipper-tape-attached bag includes: forming the enclosing seal portion 115 in the bag using a sealer; and forming the first notch 144A in a region enclosed by the enclosing seal portion 115 using a cutting blade and a receiver base facing each other across the bag. Here, although either formation of the seal portion 148 or formation of the notches 144A, 144B may be performed first, the formation of the seal portion 148 is preferably performed first in order to prevent fusion of the notches due to heat by heat sealing.

Next, a zipper tape according to a modification of the exemplary embodiments of the invention will be described.

Figure 8:
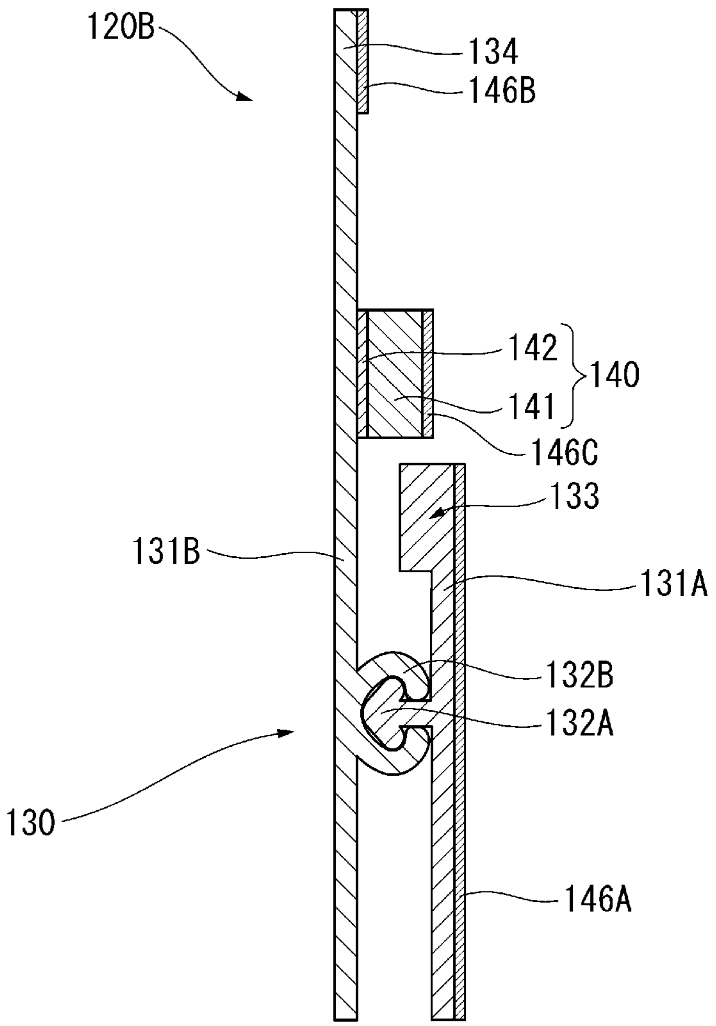
FIG. 8 is a cross sectional view showing a zipper tape according to a first modification of an exemplary embodiment of the invention.

FIG. 8 is a cross sectional view showing a zipper tape 120B according to a first modification. In the zipper tape 120B of the first modification, the cutting strip 140 is layered on the second base strip 131B.

In manufacturing a zipper-tape-attached bag, the zipper tape 120B is bonded to the first surface 111A (see FIG. 1) through the seal layers 146A, 146B, 146C.

Figure 9:
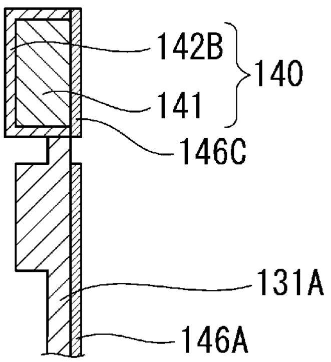
FIG. 9 is a partial cross-sectional view showing a zipper tape according to a second modification of the exemplary embodiment of the invention.

FIG. 9 is a partial cross-sectional view showing a zipper tape according to a second modification.

As shown in FIG. 9, the peelable layer 142B of the cutting strip 140 in this modification is layered on all the surfaces of the cutting strip body 141 except for a surface thereof on which the third seal layer 146C is formed.

According to this modification, a side of the cutting strip 140 close to the first base strip 131A is also easily peeled off, so that the resistance on opening a bag is further reducible. Moreover, for instance, a resin for the cutting strip body 141 or the second base strip 131B can be prevented from circumventing the peelable layer and welding, so that the cutting strip 140 can be easily and reliably separated from the second base strip 131B when opening a bag.

Figure 10:
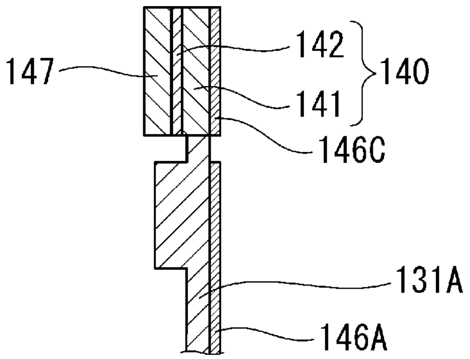
FIG. 10 is a partial cross-sectional view showing a zipper tape according to a third modification of the exemplary embodiment of the invention.
Figure 11:
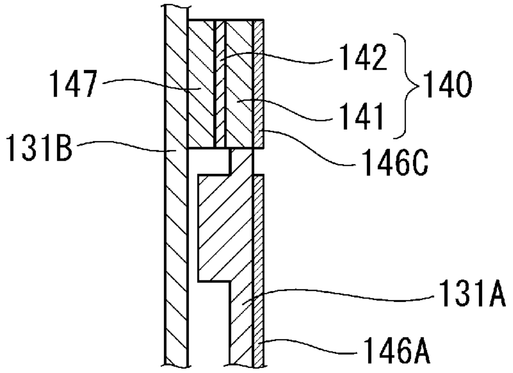
FIG. 11 is a cross sectional view showing the zipper tape according to the third modification of the exemplary embodiment of the invention, the zipper tape being bonded to a second base strip.

FIG. 10 is a partial cross-sectional view showing a zipper tape according to a third modification. FIG. 11 is a cross sectional view showing a zipper tape bonded to the second base strip.

As shown in FIG. 10, the cutting strip 140 of this modification has an additional layer 147 further layered on a surface of the peelable layer 142 opposite from the third seal layer 146C. Similar to the zipper tape body 130 and the cutting strip body 141, the additional layer 147 is formed of the resin composition whose main component is polyethylene. As shown in FIG. 11, the additional layer 147 is bonded to the second base strip 131B when the zipper tape 120 is bonded to the film 110 by heat sealing.

According to this modification, since the additional layer 147 is bonded to the second base strip 131B, for instance, a resin for the cutting strip body 141 or the second base strip 131B can be prevented from circumventing the peelable layer 142 and welding, so that the cutting strip 140 can be easily and reliably separated from the second base strip 131B when opening a bag.

Figure 12:
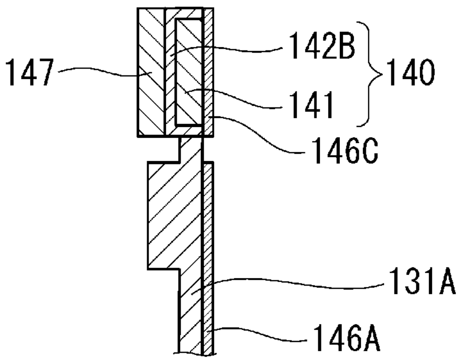
FIG. 12 is a partial cross-sectional view showing a zipper tape according to a fourth modification of the exemplary embodiment of the invention.

It should be noted that the additional layer 147 may be provided on the cutting strip 140 according to the second modification as shown in FIG. 12.

In the second and third modifications described above, a seal layer may be formed on a surface of each of the first base strip 131A, the bonding portion 134 (see FIG. 5), and the cutting strip body 141 that are bonded to the first surface 111A (see FIG. 2) in the same manner as in the modification of the first exemplary embodiment and the like. Moreover, a seal layer to be bonded to the first surface 111A may be formed on the connection portion between the cutting strip 140 and the first base strip 131A.

When polyethylene is employed as the polyolefin resin forming the zipper tape body 130 and the cutting strip body 141, for instance, a resin forming the seal layer is preferably polyethylene having a melting point of 110 degrees C. or less, more preferably metallocene linear low density polyethylene having a melting point of 105 degrees C. or less. When polypropylene is employed as the polyolefin resin forming the zipper tape body 130 and the cutting strip body 141, the resin forming the seal layer is preferably polypropylene having a melting point of 150 degrees C. or less.

Third Exemplary Embodiment

Figure 13:
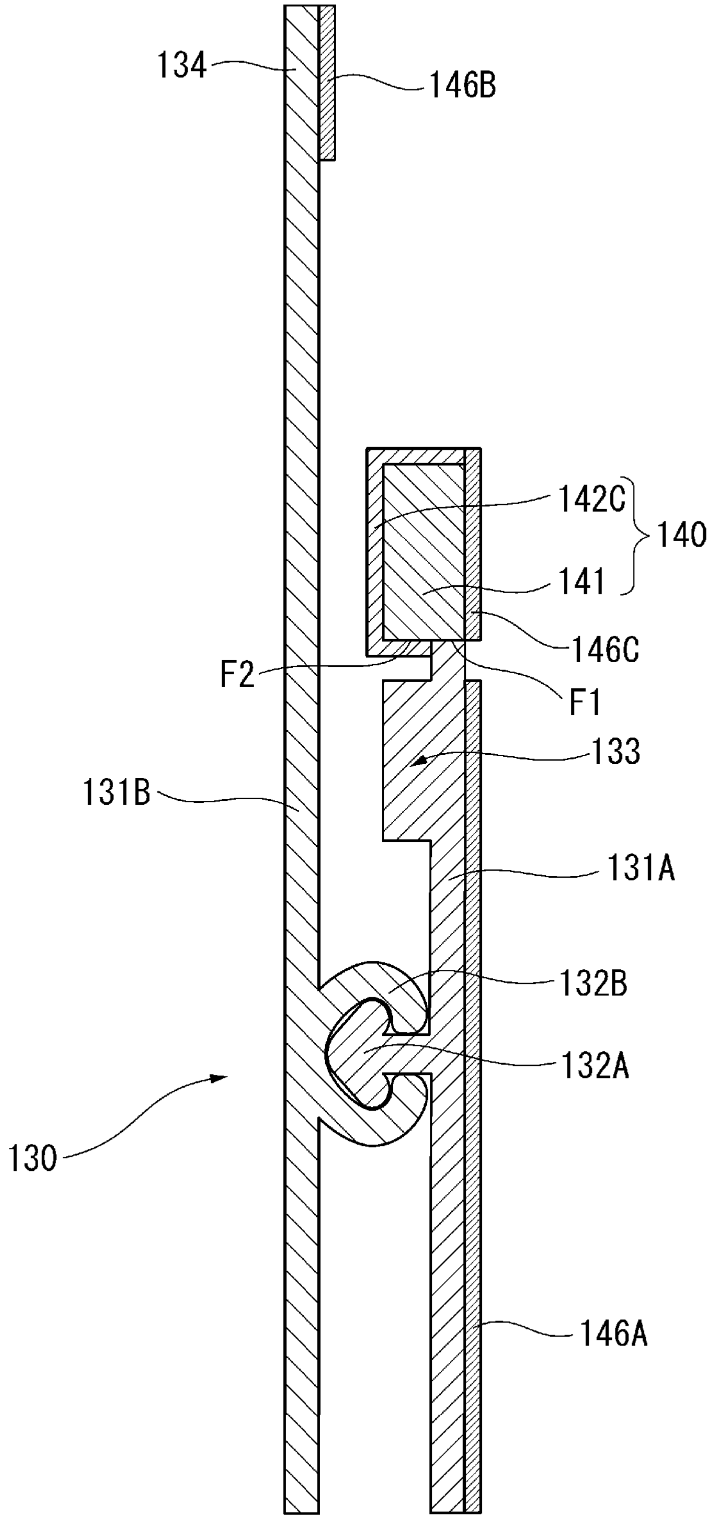
FIG. 13 is a cross sectional view showing a zipper tape in a third exemplary embodiment of the invention.

FIG. 13 is a cross sectional view showing a zipper tape in a third exemplary embodiment of the invention. It should be noted that, with respect to the components in the third exemplary embodiment which are same as or similar to those in the first exemplary embodiment, a detailed description will be omitted.

As shown in FIG. 13, a peelable layer 142C of the cutting strip 140 in the third exemplary embodiment is layered on all the surfaces of the cutting strip body 141 except for the surface bonded to the first surface 111A (see FIG. 2) of the film 110 (surface on which the third seal layer 146C is formed) and a connection surface F1 to the first base strip 131A.

In other words, the peelable layer 142C is layered on: the surface of the cutting strip body 141 facing the second base strip 131B; the surface of the cutting strip body 141 opposite from the surface connected to the first base strip 131A; and a surface F2 that is the surface of the cutting strip body 141 connected to the first base strip 131A except for the connection surface F1 to the first base strip 131A.

The peelable layer 142C in the third exemplary embodiment contains polypropylene (PP) and polyethylene (PE). When the zipper tape body 130 and the cutting strip body 141 are formed of the resin composition whose main component is polyethylene, a mass ratio PP:PE between polypropylene and polyethylene in the peelable layer 142C is preferably PP:PE=85:15 to 50:50, more preferably 80:20 to 55:45, further preferably 75:25 to 60:40. Polyethylene in the peelable layer 142C is more preferably low-density polyethylene (LDPE), further preferably linear low density polyethylene (LLDPE).

The polyolefin resin forming the zipper tape body 130 and the cutting strip body 141 is not limited to polyethylene but may be polypropylene. In this case, PP:PE in the peelable layer 142C is preferably PP:PE=15:85 to 50:50, more preferably 20:80 to 45:55, further preferably 25:75 to 40:60.

Moreover, the peelable layer 142C may contain a coloring agent such as a white pigment.

In the zipper tape of the third exemplary embodiment, in the same manner as in the modification of the first exemplary embodiment and the like, the seal layers 146A, 146B, 146C may be respectively formed on the surface of first base strip 131A, the surface of the bonding portion 134 of the second base strip 131B, and the surface of the cutting strip body 141 which are bonded to the first surface 111A.

In the exemplary embodiment, a seal layer to be bonded to the first surface 111A (see FIG. 2) may be formed on the connection portion between the cutting strip 140 and the first base strip 131A. When a gap is formed between the connection portion and the first surface 111A, a seal layer may not be formed on the connection portion.

When polyethylene is employed as the polyolefin resin forming the zipper tape body 130 and the cutting strip body 141, for instance, a resin forming the seal layer is preferably polyethylene having a melting point of 110 degrees C. or less, more preferably metallocene linear low density polyethylene having a melting point of 105 degrees C. or less. When polypropylene is employed as the polyolefin resin forming the zipper tape body 130 and the cutting strip body 141, the resin forming the seal layer is preferably polypropylene having a melting point of 150 degrees C. or less.

According to the exemplary embodiment, the peelable layer 142C is not formed on the connection surface F1 to the first base strip 131A, so that the cutting strip body 141 and the first base strip 131A are connected to each other without the peelable layer 142C therebetween. This can suppress occurrence of an unintentional cutting between the cutting strip body 141 and the first base strip 131A, for instance, when delivering a zipper tape or when inserting a zipper tape in bag-making.

Moreover, since the peelable layer 142C is layered on the surface F2 that is the surface of the cutting strip body 141 connected to the first base strip 131A except for the connection surface F1 to the first base strip 131A, it can be prevented that openability of a bag is impaired, for instance, due to welding of the surface F2 of the cutting strip body 141 to other parts when making a zipper-tape-attached bag.

Further, since the mass ratio between polypropylene and polyethylene in the peelable layer 142C is defined at the above mass ratio and polyethylene in addition to polypropylene is contained in the peelable layer 142C, it can be more suppressed that when the zipper tape 120 is crushed at the side seal portions 114 (see FIG. 1), interfacial peeling occurs between the cutting strip 140 and the second base strip 131B to form a gap in the side seal portions 114 and cause contents to leak through the gap.

In the exemplary embodiment, the peelable layer 142C is layered on all the surfaces of the cutting strip body 141 except for the surface thereof bonded to the first surface 111A and the connection surface F1 to the first base strip 131A, however, the arrangement of the peelable layer 142C is not limited thereto. It is sufficient that the peelable layer 142C is layered on at least the opposite surface of the cutting strip body 141 from the surface bonded to the first surface 111A. It is sufficient that the peelable layer 142C is preferably further layered on at least one of: a surface of the cutting strip body 141 that is close to the first base strip 131A and is closer to the second surface 111B than the connection surface F1; or an opposite surface of the cutting strip body 141 from the first base strip 131A, more preferably, layered on both of these surfaces. In other words, the peelable layer 142C is not necessarily required to be layered on the entire surface of the cutting strip body 141 close to the first base strip 131A.

Moreover, in the exemplary embodiment, polyethylene is added to the peelable layer 142C whose main component is polypropylene or polypropylene is added to the peelable layer 142C whose main component is polyethylene, thereby suppressing leakage, however, the composition of the peelable layer 142C is not limited thereto. For instance, a layer containing polypropylene and polyethylene may be provided on a portion of the second base strip 131B facing the cutting strip 140. Alternatively, polypropylene may be contained at a predetermined amount in the portion of the second base strip 131B facing the cutting strip 140. Alternatively, as shown in the third modification (FIG. 10), the additional layer 147 may be further layered on the opposite surface of the peelable layer 142 from the third seal layer 146C, and polypropylene and/or polyethylene may be contained in the additional layer 147.

Figure 14:
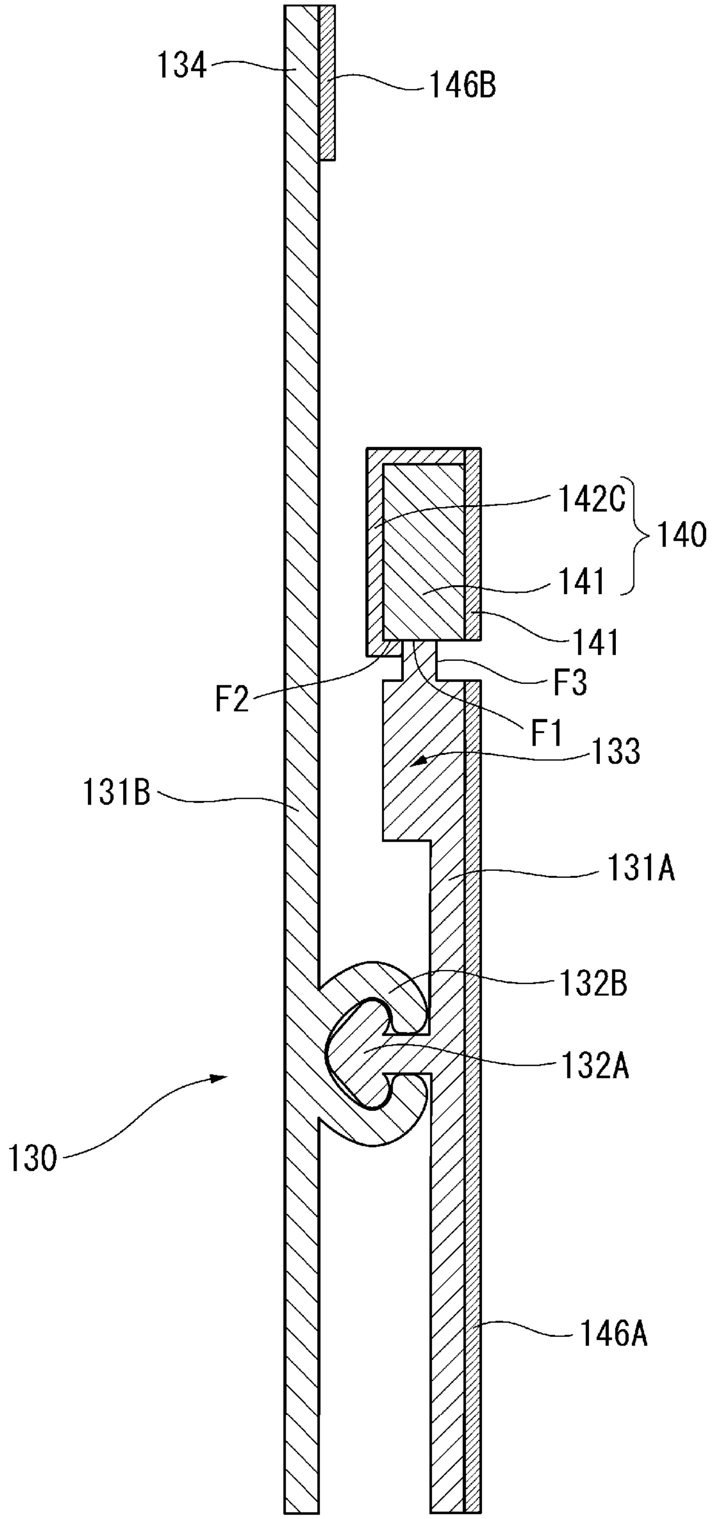
FIG. 14 is a cross sectional view showing a zipper tape in a modification of the third exemplary embodiment of the invention.

As shown in FIG. 14, a surface F3 of the connection portion between the cutting strip 140 and the first base strip 131A, the surface F3 facing the first surface 111A, is not required to be flush with the surface of the cutting strip body 141 being bonded to the first surface 111A and the surface of the first base strip 131A being bonded to the first surface 111A. In this case, the peelable layer 142C is preferably also formed on a surface of the cutting strip body 141 that is close to first base strip 131A and is closer to the first surface 111A than the connection surface F1. Moreover, in addition to the opposite surface of the cutting strip body 141 from the surface bonded to the first surface 111A, it is sufficient that the peelable layer 142C is layered on at least one surface of: the opposite surface of the cutting strip body 141 from the surface bonded to the first base strip 131A; the surface of the cutting strip body 141 closer to the first surface 111A than the connection surface F1; or the surface of the cutting strip body 141 closer to the second surface 111B than the connection surface F1.

EXAMPLES

Next, the invention will be described more in detail with reference to Examples. It should be noted that the invention is by no means limited to the details of these Examples and the like. A zipper-tape-attached bag was manufactured using a predetermined manufacturing device in each Example. A film forming a bag body is a laminate of a 12-μm biaxial-drawing polyethylene terephthalate (PET) film and 50-μm linear low density polyethylene (LLDPE). Materials for the peelable layer 142C shown in Table 1 were used. In Table 1, PP represents polypropylene and LLDPE represents linear low density polyethylene.

TABLE 1

| | Materials (mass %) | | | | Peel |
|---|---|---|---|---|---|
| | PP | LLDPE | Coloring Agent | Leak Evaluation | Strength (N/15 mm) |
| Example 1 | 76 | 20 | 4 | B | 4.9 |
| Example 2 | 66 | 30 | 4 | A | 6.0 |
| Example 3 | 56 | 40 | 4 | A | 15.8 |
| Example 4 | 96 | 0 | 4 | C | 1.5 |

Leak Evaluation

First, a leak evaluation will be described. In the leak evaluation, a leak liquid (trade name: dye penetrant FP-S manufactured by Taseto Co., Ltd.) was encapsulated in a zipper-tape-attached bag, and subsequently, presence or absence of leaks and the like were evaluated.

The leak evaluation was conducted according to a method described below.

(1) The bag in an engagement state was opened, into which the leak liquid was encapsulated. The top seal portion 112 was sealed. Subsequently, the cutting strip was rubbed about 10 times and placed under reduced pressure of −0.06 MPa for 30 seconds.

(2) After the leak liquid was encapsulated, the zipper-tape-attached bag with the leak liquid encapsulated was left still while being hung for three days.

Table 1 shows the leak evaluation. In columns of the leak evaluation in Table 1, A represents that leakage did not occur at all, B represents that the leak liquid was bleeding but leakage fell within the allowable range, and C represents that leakage occurred due to peeling between the cutting strip and the second base strip, leading to probability of restricting an intended use.

As shown in Table 1, it was found that occurrence of leakage due to interfacial peeling between the cutting strip and the second base strip was able to be suppressed in Examples 1 to 3 in which the peelable layer contained linear low density polyethylene. In particular, in Example 2 in which a content of linear low density polyethylene was 30 mass % and in Example 3 in which the content of linear low density polyethylene was 40 mass %, no bleeding of the leak liquid was observed, which was more favorable result. On the other hand, leakage occurred due to interfacial peeling between the cutting strip and the second base strip in Example 4 in which the peelable layer did not contain linear low density polyethylene.

Peel Strength Evaluation

Peel strength evaluation was conducted according to a method described below.

(1) The cutting strip 140 and the second base strip 131B were heat-sealed using a thermal gradient tester under heat sealing conditions (heat sealing temperature of 230 degrees C., sealing pressure of 0.2 MPa, and sealing time of 1 second).

(2) The cutting strip 140 was pulled at a speed of 300 mm/minute using a push pull gauge (manufactured by IMADA Co., Ltd.) and a maximum strength for peeling the sealed cutting strip 140 and second base strip 131B from each other was measured.

As shown in Table 1, all Examples demonstrated favorable results that the peel strength was below 20 N/15 mm. In particular, Examples 1, 2 and 4 demonstrated more favorable peelability with the peel strength being below 10 N/15 mm.

Suitable exemplary embodiments of the invention have been detailed above with reference to the attached drawings. However, the scope of the invention is not limited to these exemplary embodiments. It would be obvious to those skilled in the art to which the invention pertains that various modifications and revisions are conceivable within the technical idea described within the scope of claims, and it is understood that such modifications and revisions are naturally within the technical scope of the invention.

The invention claimed is:

1. A zipper tape comprising:

a zipper tape body comprising: a first base strip; a second base strip partially facing the first base strip and having a region not facing the first base strip; and a first engagement portion and a second engagement portion being mutually engageable and projecting from the first base strip and the second base strip, respectively; and a cutting strip provided in a region where the second base strip does not face the first base strip, wherein the zipper tape body is formed of a first resin composition whose main component is a polyolefin resin, and the cutting strip consists of:

a cutting strip body formed of a second resin composition whose main component is the polyolefin resin; and a peelable layer layered on at least a part of at least a surface of the cutting strip body facing the second base strip, the peelable layer being formed of a third resin composition having peelability with respect to the polyolefin resin.

2. The zipper tape according to claim 1, wherein the polyolefin resin is polyethylene, and the main component of the third resin composition is polypropylene.

3. The zipper tape according to claim 1, wherein the polyolefin resin is polypropylene, and the main component of the third resin composition is polyethylene.

4. The zipper tape according to claim 1, wherein the second base strip is formed wider than the first base strip.

5. The zipper tape according to claim 1, wherein the cutting strip is connected to an end of the first base strip close to the bonding portion so as to be integrated with the first base strip.

6. The zipper tape according to claim 1, wherein the cutting strip is layered on the second base strip.

7. The zipper tape according to claim 1, wherein the peelable layer is layered on at least a part of the cutting strip in a width direction.

8. The zipper tape according to claim 1, wherein the peelable layer is layered on all surfaces of the cutting strip body except for an opposite surface thereof from the second base strip.

9. The zipper tape according to claim 1, further comprising an additional layer that is layered on the peelable layer on the opposite surface from the cutting strip body and is formed of a fourth resin composition whose main component is the polyolefin resin.

10. The zipper tape according to claim 1, wherein the polyolefin resin in the zipper tape has a content of 70 mass % or more.

11. The zipper tape according to claim 1, further comprising: a first seal layer formed on an opposite surface of the first base strip from the second base strip; a second seal layer formed on a surface of a bonding portion included in the region where the second base strip base does not face the first base strip; and a third seal layer formed on an opposite surface of the cutting strip body from the second base strip.

12. The zipper tape according to claim 1, wherein the cutting strip is connected to an end of the first base strip through a connection surface so as to be integrated with the first base strip.

13. The zipper tape according to claim 12, wherein the peelable layer is further layered on at least one surface of: at least the opposite surface of the cutting strip body from the first base strip; a surface of the cutting strip body close to the first base strip and closer to the first base strip in relation to the connection surface; or a surface of the cutting strip body close to the first base strip and opposite from the first base strip in relation to the connection surface.

14. The zipper tape according to claim 12, wherein the polyolefin resin is polyethylene, the polyethylene is linear low density polyethylene, and the third resin composition contains polypropylene as a main component, and polyethylene.

15. A zipper-tape-attached bag comprising:

a bag body having a first surface and a second surface opposite from each other; and the zipper tape according to claim 1 wherein the first base strip, the cutting strip, and the bonding portion are bonded to the first surface, wherein a first notch formed in at least the first surface and the cutting strip defines a tab.

16. The zipper-tape-attached bag according to claim 15, wherein the tab is formed in a seal portion provided by sealing the first surface and the second surface, the first notch penetrates the first surface and the second surface, and the seal portion further comprises a second notch starting from the second surface and not penetrating the cutting strip.

17. A manufacturing method of the zipper-tape-attached bag according to claim 16, comprising:

forming the seal portion in the bag body using a sealer; and forming a second notch in the seal portion using a cutting blade and a receiver base facing each other across the bag body.

18. The zipper-tape-attached bag according to claim 15, further comprising: an enclosing seal portion provided by sealing the first surface and the second surface in a region enclosing the tab.

19. The manufacturing method of the zipper-tape-attached bag according to claim 18, further comprising:

forming the enclosing seal portion in the bag body using a sealer; and forming a first notch in a region enclosed by the enclosing seal portion using a cutting blade and a receiver base facing each other across the bag body.

20. A zipper tape comprising:

a zipper tape body comprising: a first base strip a second base strip partially facing the first base strip and having a region not facing the first base strip and a first engagement portion and a second engagement portion being mutually engageable and projecting from the first base strip and the second base strip, respectively; and a cutting strip provided in a region where the second base strip does not face the first base strip, wherein the zipper tape body is formed of a resin composition whose main component is a polyolefin resin, and the cutting strip comprises:

a cutting strip body formed of the resin composition whose main component is the polyolefin resin and a peelable layer layered on at least a part of at least a surface of the cutting strip body facing the second base strip, the peelable layer being formed of a resin composition having peelability with respect to the polyolefin resin.

21. The zipper tape according to claim 20, further comprising an additional layer that is layered on the peelable layer on the opposite surface from the cutting strip body and is formed of a fourth resin composition whose main component is the polyolefin resin.

22. A zipper-tape-attached bag comprising:

a bag body having a first surface and a second surface opposite from each other;

a zipper tape body comprising: a first base strip bonded to the first surface; a second base strip partially facing the first base strip and having a region not facing the first base strip, the region including a bonding portion bonded to the first surface; and a first engagement portion and a second engagement portion being mutually engageable and projecting from the first base strip and the second base strip, respectively; and a cutting strip provided in a region where the second base strip faces the first surface and does not face the first base strip, wherein the zipper tape body is formed of a resin composition whose main component is a polyolefin resin, and the cutting strip comprises:

a cutting strip body formed of the resin composition whose main component is the polyolefin resin, and bonded to the first surface; and a peelable layer layered on at least one part of at least an opposite surface of the cutting strip body from a surface of the cutting strip body bonded to the first surface, the peelable layer being formed of a resin composition having peelability with respect to the polyolefin resin.

23. The zipper-tape-attached bag according to claim 22, further comprising an additional layer that is layered on the peelable layer on the opposite surface from the cutting strip body and is formed of a fourth resin composition whose main component is the polyolefin resin.

24. A zipper tape comprising:

a zipper tape body comprising: a first base strip; a second base strip partially facing the first base strip and having a region not facing the first base strip; and a first engagement portion and a second engagement portion being mutually engageable and projecting from the first base strip and the second base strip, respectively; and a cutting strip provided in a region where the second base strip does not face the first base strip, wherein the zipper tape body is formed of a first resin composition whose main component is a polyolefin resin, and the cutting strip comprises:

a cutting strip body consisting of a single layer formed of a second resin composition whose main component is the polyolefin resin; and a peelable layer layered on at least a part of at least a surface of the cutting strip body facing the second base strip, the peelable layer being formed of a third resin composition having peelability with respect to the polyolefin resin.

25. The zipper-tape according to claim 24, wherein at least one pair of the first base strip and the first surface, the bonding portion and the first surface, or the cutting strip body and the first surface are bonded to each other through a seal layer.

26. The zipper tape according to claim 24, further comprising an additional layer that is layered on the peelable layer on the opposite surface from the cutting strip body and is formed of a fourth resin composition whose main component is the polyolefin resin.

27. A zipper-tape-attached bag comprising:

a bag body having a first surface and a second surface opposite from each other;

a zipper tape body comprising: a first base strip bonded to the first surface; a second base strip partially facing the first base strip and having a region not facing the first base strip, the region including a bonding portion bonded to the first surface; and a first engagement portion and a second engagement portion being mutually engageable and projecting from the first base strip and the second base strip, respectively; and a cutting strip provided in a region where the second base strip faces the first surface and does not face the first base strip, wherein the zipper tape body is formed of a first resin composition whose main component is a polyolefin resin, and the cutting strip consists of:

a cutting strip body formed of a second resin composition whose main component is the polyolefin resin, and bonded to the first surface; and a peelable layer layered on at least one part of at least an opposite surface of the cutting strip body from a surface of the cutting strip body bonded to the first surface, the peelable layer being formed of a third resin composition having peelability with respect to the polyolefin resin.

28. The zipper-tape-attached bag according to claim 27, further comprising an additional layer that is layered on the peelable layer on the opposite surface from the cutting strip body and is formed of a fourth resin composition whose main component is the polyolefin resin.

29. A zipper-tape-attached bag comprising:

a bag body having a first surface and a second surface opposite from each other;

a zipper tape body comprising: a first base strip bonded to the first surface; a second base strip partially facing the first base strip and having a region not facing the first base strip, the region including a bonding portion bonded to the first surface; and a first engagement portion and a second engagement portion being mutually engageable and projecting from the first base strip and the second base strip, respectively; and a cutting strip provided in a region where the second base strip faces the first surface and does not face the first base strip, wherein the zipper tape body is formed of a first resin composition whose main component is a polyolefin resin, and the cutting strip comprises:

a cutting strip body consisting of a single layer formed of a second resin composition whose main component is the polyolefin resin, and bonded to the first surface; and a peelable layer layered on at least one part of at least an opposite surface of the cutting strip body from a surface of the cutting strip body bonded to the first surface, the peelable layer being formed of a third resin composition having peelability with respect to the polyolefin resin.

30. The zipper-tape-attached bag according to claim 29, further comprising an additional layer that is layered on the peelable layer on the opposite surface from the cutting strip body and is formed of a fourth resin composition whose main component is the polyolefin resin.

* * * * *